July 10, 1951  F. D. CROW  2,560,090
SNAP ACTION VALVE MECHANISM
Filed Nov. 13, 1946

INVENTOR
FRANK D. CROW
BY Wheeler, Wheeler & Wheeler
ATTORNEYS

Patented July 10, 1951

2,560,090

UNITED STATES PATENT OFFICE 2,560,090

SNAP ACTION VALVE MECHANISM

Frank D. Crow, Thiensville, Wis.

Application November 13, 1946, Serial No. 709,448

13 Claims. (Cl. 74—97)

This invention relates to a snap action valve mechanism.

It is a primary object of the invention to provide a novel and improved means whereby a float will control abrupt opening and closing movements of a valve. More specifically, it is a very important object of the invention to provide a float operated snap action valve control mechanism in which means for limiting float movement and maintaining the snap action parts in assembly also positively operates the valve to its closed position so that, regardless of the proper functioning of the snap action mechanism, the valve will be positively closed when the float is raised.

Further objects include the provision of a construction which is exceptionally simple and can be cheaply manufactured and easily assembled and disassembled; and a construction in which a valve is caused to close with a camming action against water pressure and is opened by the water pressure when the camming action is released.

Other objects of the invention will be more clearly apparent from the following disclosure thereof.

Figure 1:
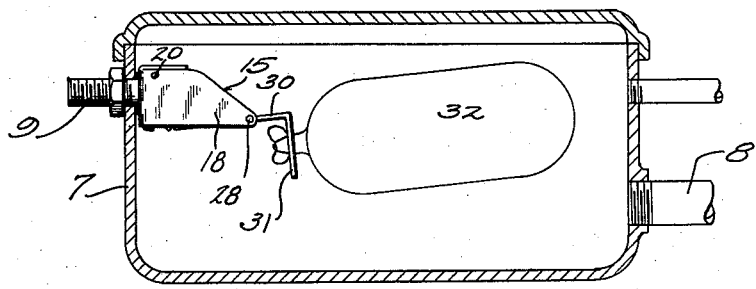
Fig. 1 is a side elevation of the valve structure and float assembled for use in a float chamber as shown in cross section.

Merely for convenience of illustration, I have shown in Fig. 1 the installation of my improved valve in a float chamber 7 such as is used to feed through pipe 8 an evaporating pan in a furnace for humidification purposes. The device is, of course, not limited to such use, and features of the snap action mechanism are not limited even to valve operation, as will be made apparent in the accompanying claims.

The water supply fitting 9 terminates in a nozzle 10 which is tapered to provide a valve seat 11 at its end.

Figure 2:
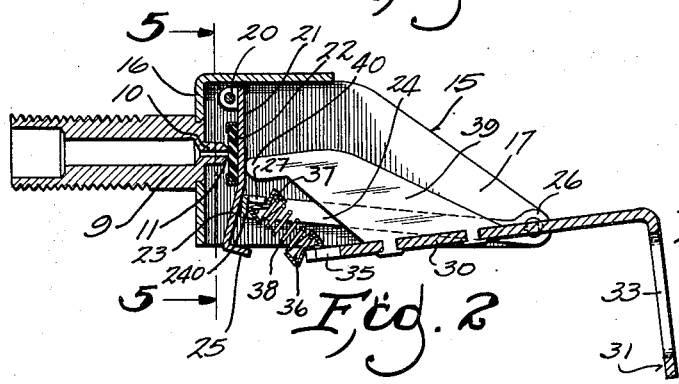
Fig. 2 is a view through the valve in longitudinal section on an enlarged scale.
Figure 5:
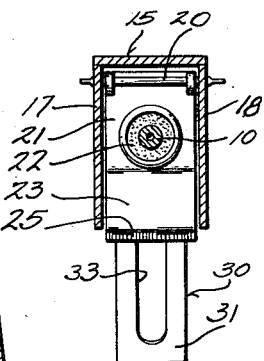
Fig. 5 is a view taken in section on the line 5—5 of Fig. 2.
Figure 3:
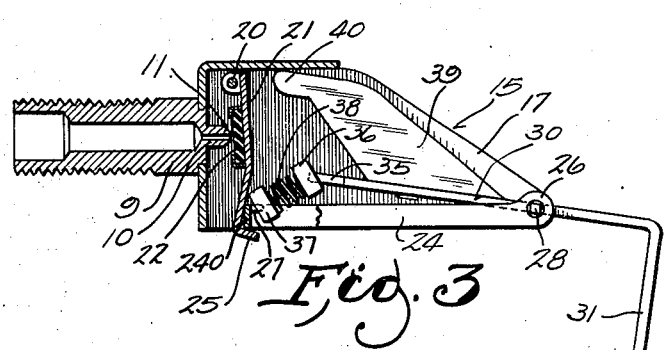
Fig. 3 is a view similar to Fig. 2 showing the parts in the relative positions that they occupy when the valve is open.
Figure 6:
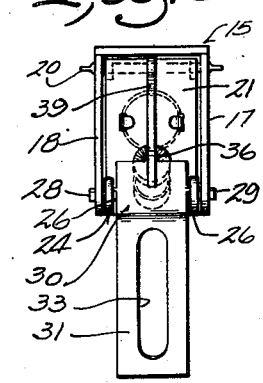
Fig. 6 is a view of the valve in end elevation.

The bracket generically designated by reference character 15 comprises a back plate 16 to which the fitting 9 is riveted as best shown in Fig. 2 and Fig. 3. From each side of the back plate, the substantially parallel arms 17, 18 extend forwardly. The space between these arms is spanned, near the top of the bracket, by a pintle 20, the ends of which project and are wedged, as shown in Fig. 4, to preclude loss of the pintle.

Upon this pintle is pivoted an actuated lever, here represented as valve lever 21. This lever is provided with a resilient valve body at 22 movable to and from the seat 11. Below the valve body, the lever extends angularly at 23 to provide a cam surface engaged by motion communicating camming lever 24. A lip 25 limits downward relative movement of the cam lever, as shown in Fig. 3.

Figure 4:
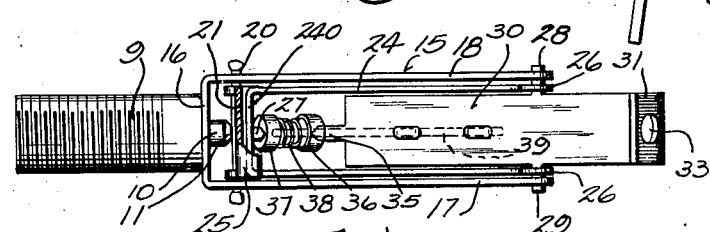
Fig. 4 is a bottom plan view of the valve as it appears with portions broken away to expose the underlying structure.

Cam lever 24 is U-shaped, as best shown in Fig. 4, having parallel arms terminating in eyes 26. The transverse portion 240 of the lever 24 which connects said arms is provided centrally with an integral lug 27 to receive the thrust of one of the seats for the snap action spring hereinafter to be described.

The free ends of the two arms 17 and 18 of the bracket have corresponding apertures to receive trunnions 28, 29 which are formed integrally to project laterally from the sides of the actuating lever 30. These trunnions also serve as pintle pins for the eyes 26 of the two legs of the camming lever 24. There is sufficient resilience in the metal used so that the legs of camming lever 24 may be sprung apart to receive the trunnions 28, 29 into the eyes 26. The two arms 17, 18 of the bracket are then sprung apart to receive the trunnions whereby, in effect, camming lever 24 and the operating lever 30 are pivoted coaxially at the ends of the bracket arms.

The operating lever 30 has an angle at 31 for connection with any desired operating means, such as float 32. The float has means whereby it is engaged in the slot 33 provided in the angle 31.

At the opposite end of the actuating lever 30 is an integral longitudinally projecting peg 35 with which is engaged a spring seat cup 36. An identical cup 37 is engaged with the prong 27 of the camming lever 24. Between these cups is confined the compression spring 38. Each of the cups is concave at its end, as best shown in Fig. 2, whereby the cups are positioned pivotally at the ends of the respective prongs 35 and 27, no other securing means being required. When the angle 31 at the operating end of the actuating lever 30 moves downwardly to the position shown in Fig. 3, the prong 35 of such lever gradually moves upwardly from the position shown in Fig. 2 until it passes the center line of the camming lever 24. In the course of this movement, the spring 38 is being compressed and, as the operating lever 30 continues to move about its fulcrum as represented by trunnions 28, 29 the change in angle of the spring 38 causes it to push the camming lever 24 downwardly toward the position of Fig. 3. This movement is performed abruptly due to the sudden expansion of spring 38. As aforesaid, the flange 25 acts as a limiting stop to determine the extent of this movement.

In the course of this movement, the portion 240 of the camming lever moves down the inclined cam surface 24 of the valve lever 21 with the result that the valve is no longer held to its seat. Under pressure of the water supplied through fitting 9, the valve opens as shown in Fig. 3.

When the float or other operating means connected to the actuating lever 30 causes the outer end of such lever to rise toward the Fig. 2 position thereof, the spring 38 is again compressed until the prongs 26 and 27 are aligned. Movement beyond this point permits the spring 38 to expand again with the result that the camming lever 24 is moved abruptly upwardly toward the position shown in Fig. 2.

The length of the camming lever is such that in the course of its upward movement, its transverse end portion 240 operates with a camming action against the inclined cam surface 23 of valve lever 21, ultimately forcing the valve 22 against seat 11 to cut off flow through fitting 9. Due to the camming action, the valve is seated with sufficient power to assure a firm seat even against substantial pressure in fitting 9.

Mounted on the actuating lever 30 is an arm 39 terminating in finger 40. This finger engages the valve lever 21 for two purposes. In the first place, it limits downward swinging movement of the actuating lever 30 beyond the position shown in Fig. 2 and thus prevents the escape of the spring 38. In the second place, it provides means whereby motion of the actuating lever is communicated directly to the valve lever 21, independently of the snap action mechanism so that, despite any failure of the snap action mechanism, the float movement will be communicated with a camming action directly to the valve lever to assure the closing of the valve. This important result is achieved without the use of any parts other than those required for the normal functioning of the snap action mechanism.

The spring assembly comprising the compression spring 38 and the two cups 36 and 37 which provide seats at the ends thereof, is inserted and removed unitarily. The rest of the mechanism being assembled as already described, and the spring cups being assembled to the ends of the spring, one of the cups is placed in position on one of the prongs as, for example, prong 27. Thereupon, by pressure on the other cup, the spring 38 is compressed sufficiently so that the other cup may be engaged by the other prong. That is all that is necessary to effect the assembly.

It will therefore be apparent that I have provided an extremely simple and effective valve mechanism which is made of few and simple parts and may easily be assembled and which nevertheless has means for positively closing the valve in the event that the snap action mechanism fails to operate. This guards against great damage which might result otherwise in the event of a failure of the snap action mechanism to close the valve.

It will be apparent to those skilled in the art that the snap action mechanism has utility whether or not it is used to operate the valve. It is, however, especially designed for valve operation as will likewise be apparent from the structure and mode of operation as herein disclosed.

I claim:

1. In a device of the character described, the combination with an actuating lever and an actuated lever, of a motion communicating lever engageable with the actuated lever for transmitting motion thereto, a snap action mechanism between the actuating lever and the motion communicating lever including spring means reversible as to its direction of thrust during the movement of the actuating lever and adapted to communicate such thrust impositively to the motion communicating lever, and means carried by the actuating lever positively engageable with the actuated lever at one extreme of movement of the actuating lever for positively operating the actuated lever at such extreme, whereby to assure motion of the actuated lever in one direction regardless of failure of said snap action mechanism.

2. The combination with an actuated lever of an actuating lever and a motion communicating lever having at least approximately coaxial fulcrum means at a point remote from the actuated lever, the actuated lever having a cam surface engageable by the motion communicating lever in one position of the latter and releasable by the motion communicating lever in another position of the latter, a snap action spring mechanism for impositively operating the motion communicating lever from the actuating lever, and means for limiting the range of movement of the actuating lever including a finger connected therewith and operatively engageable with the actuated lever whereby positively to operate said actuated lever in the event of failure of said snap action mechanism.

3. The combination with an actuated lever pivoted for movement between two extreme positions and provided on its face with a cam surface extending toward, and wholly at one side of, the pivot of said lever, of a camming lever extending substantially at right angles to the actuated lever and having a pivot remote from the actuated lever and having a portion movable against said cam surface toward the pivot of the actuated lever for effecting movement of the actuated lever from one of said positions to the other, an actuating lever, and a snap action spring mechanism operatively connected between the actuating lever and the camming lever for impositively operating the latter in a direction to engage the camming lever with the cam surface of the actuated lever for effecting movement of the actuated lever.

4. The device of claim 3 in which the actuating lever has an arm for limiting its range of movement to that required for operating said snap action mechanism, together with a fixed stop limiting the movement of the arm in one direction, the arm being directly engageable with the actuated lever to limit the movement of the arm in the opposite direction, such engagement being adapted to assure the movement of the actuated lever in the direction in which it is normally moved by the camming lever through the operation of the snap action mechanism.

5. In a device of the character described, the combination with an actuated lever provided near one of its ends with a fulcrum and extending almost rectilinearly therefrom and provided at an intermediate point with a work piece connection and provided beyond said work piece connection with a camming surface extending along a face of said lever and, at its extreme end, with a stop, of a motion communicating camming lever having a fulcrum remote from said actuated lever and extending almost at right angles thereto and provided with a camming element at its free end, said element being movable along said actuated lever toward its fulcrum into engagement with said camming surface to effect movement of the actuated lever and to arrest movement of the camming lever, said element being movable in the opposite direction to free said actuated lever and arrest movement of the camming lever against said stop, an actuating lever having a fulcrum and provided with a prong, said camming lever having a complementary prong, the said prongs being movable through aligned positions in the operation of the actuating and camming levers, a compression spring provided with seats pivoted on the respective prongs whereby said compression spring and seats constitute a snap action mechanism for storing energy in the initial movement of the actuating lever to deliver such energy to the camming lever.

6. The device of claim 5 in which the actuating lever is provided with an arm for limiting its range of pivotal movement and in further combination with a bracket providing fulcrums for the several levers and a fixed stop with which said arm is engageable at one extreme of movement of the actuating lever, said arm being adapted in another extreme movement of the actuating lever to engage directly against the actuated lever whereby positively to assure movement of the actuated lever.

7. A snap action device comprising the combination with a bracket, of an actuated lever pivoted to the bracket, said lever having a cam portion extending along the face of the lever, and a stop portion at its free end, a camming lever provided with a fulcrum mounting for movement respecting a remote portion of the bracket, said camming lever projecting toward the actuated lever and movable to and from positions of engagement with the cam portion of the actuated lever, said camming lever being engageable with the stop portion of the actuated lever to limit cam lever movement, an actuating lever provided with fulcrum means supporting it from the bracket and projecting toward the actuated lever, snap action mechanism comprising a spring in operative motion transmitting connection between the actuating lever and the cam lever and movable across center to store energy and deliver such energy abruptly to the cam lever for impositively actuating the cam lever, and means connected with the actuating lever for positively engaging the actuated lever in a direction to supplement the action of said snap action mechanism in moving the actuated lever.

8. The device of claim 7 in which the positive actuating means comprises an arm mounted directly on the actuating lever and engageable with the actuated lever as a stop to limit movement of the actuating lever in one direction, said bracket having a portion engaged by said arm to serve as a stop for limiting movement of said actuating lever in the opposite direction.

9. The device of claim 7 in which the cam lever comprises a U-shaped lever having at its fulcrum end eyes through which trunnions on the actuating lever extend into pivotal engagement with said bracket, the actuating lever being disposed between the arms of the cam lever.

10. A snap action mechanism comprising a fitting provided with a bracket mounted on said fitting and having spaced arms, a pintle spanning the space between the arms, an actuated lever mounted on the pintle, the free end of the actuated lever being provided with a cam portion and a stop, an actuating lever provided with trunnions, the bracket arms being apertured to receive said trunnions at a point remote from the actuated lever, a cam lever in the shape of a U having spaced legs between which said actuating lever is disposed, said legs terminating in eyes engaged over said trunnions, opposed prongs on the end of the cam lever and the end of the actuating lever, snap action mechanism comprising a compression spring and spring seat cups having concave heads engaged on the respective prongs for transmitting motion from the actuating lever to the cam lever, the free end of the cam lever being engageable with the cam surface of the actuated lever for actuating the actuated lever in one direction and being engageable with the stop at the free end of the actuated lever when disengaged from said cam.

11. A snap action mechanism comprising a fitting provided with a bracket mounted on said fitting and having spaced arms, a pintle spanning the space between the arms, an actuated lever mounted on the pintle, the free end of the actuated lever being provided with a cam portion and a stop, an actuating lever provided with trunnions, the bracket arms being apertured to receive said trunnions at a point remote from the actuated lever, a cam lever in the shape of a U having spaced legs between which said actuating lever is disposed, said legs terminating in eyes engaged over said trunnions, opposed prongs on the end of the cam lever and the end of the actuating lever, snap action mechanism comprising a compression spring and spring seat cups having concave heads engaged on the respective prongs for transmitting motion from the actuating lever to the cam lever, the free end of the cam lever being engageable with the cam surface of the valve lever for actuating the actuated lever in one direction and being engageable with the stop at the free end of the actuated lever when disengaged from said cam, and an arm mounted on the actuating lever and provided with a finger for limiting movement of the actuating lever, said bracket providing a stop engaged by said finger in a releasing direction of movement of the actuating lever, and said finger being engageable directly with the actuated lever to limit the movement of the actuating lever in an engaging direction, said finger further serving to communicate motion directly from the actuating lever to the actuated lever in such engaging direction whereby to assure the operation thereof regardless of the functioning of such snap action mechanism.

12. In a device of the character described, the combination with an actuated lever pivoted for movement between operative and retracted positions, said lever being provided with a cam surface extending toward its pivot, of a camming lever having a fulcrum remote from said actuated lever and extending toward said actuated lever, said camming lever having camming means movable along the cam surface of the actuated lever, an actuating device provided with snap action mechanism for the operation of said camming lever between two positions, in one of which said camming means frees said actuated lever for movement toward its retracted position, and in the other of which said camming means is engaged with the cam surface of the actuated lever for forcing said lever to its operative position, the reaction of said actuated lever upon said camming means and camming lever in the last mentioned position being approximately on a radius extending from said camming means to the fulcrum of said camming lever.

13. In a device of the character described, the combination with a fitting provided with a pintle, of an actuated lever pivoted upon said pintle for movement between operative and retracted positions, said operated lever being provided on one of its faces with a cam surface extending in the general direction of said pintle, but slightly oblique with reference to a radius drawn from said pintle, a camming lever for which said fitting provides a pintle remote from the actuated lever, said camming lever extending toward the actuated lever substantially at right angles thereto and being provided at its free end with camming means adapted to co-act with said cam surface as said camming lever approaches a position normal to a radius drawn from the pintle of the actuated lever, the camming lever being adapted to free said surface to permit the actuated lever to move to its retracted position when said camming lever is moved away from said normal position, together with an actuating lever and a snap action spring mechanism connecting the actuating lever with the camming lever for effecting abrupt movement of the camming lever toward and from said normal position for causing and releasing camming engagement of said camming means with the cam surface of the actuated lever.

FRANK D. CROW.

REFERENCES CITED

The following references are of record in the file of this patent:

UNITED STATES PATENTS

| Number | Name | Date |
|---|---|---|
| 1,158,060 | Klein | Oct. 26, 1915 |
| 1,493,640 | Nachbaur | May 13, 1924 |
| 1,549,193 | Fox | Aug. 11, 1925 |
| 1,602,871 | Aalborg | Oct. 12, 1926 |
| 1,679,729 | Lynn | Aug. 7, 1928 |
| 1,871,044 | Crosthwait | Aug. 9, 1932 |
| 2,075,548 | Schaser | Mar. 30, 1937 |
| 2,237,174 | Carlson | Apr. 1, 1941 |
| 2,267,688 | Landon | Dec. 23, 1941 |
| 2,309,043 | Breckheimer | Jan. 19, 1943 |
| 2,402,838 | Obszarny | June 25, 1946 |